US012005705B2

(12) United States Patent
Misaizu

(10) Patent No.: US 12,005,705 B2
(45) Date of Patent: Jun. 11, 2024

(54) PRINTING DEVICE AND CORRECTION METHOD

(71) Applicant: MIMAKI ENGINEERING CO., LTD., Nagano (JP)

(72) Inventor: Takuhide Misaizu, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 215 days.

(21) Appl. No.: 17/642,696

(22) PCT Filed: Sep. 28, 2020

(86) PCT No.: PCT/JP2020/036644
§ 371 (c)(1),
(2) Date: Mar. 13, 2022

(87) PCT Pub. No.: WO2021/070662
PCT Pub. Date: Apr. 15, 2021

(65) Prior Publication Data

US 2022/0324224 A1 Oct. 13, 2022

(30) Foreign Application Priority Data

Oct. 10, 2019 (JP) ................................ 2019-186729

(51) Int. Cl.
*B41J 2/045* (2006.01)

(52) U.S. Cl.
CPC ....... *B41J 2/04505* (2013.01); *B41J 2/04586* (2013.01)

(58) Field of Classification Search
CPC ........ B41J 19/145; B41J 2/2135; B41J 11/46; B41J 29/393; B41J 2/2139; G06K 15/027
See application file for complete search history.

(56) References Cited

U.S. PATENT DOCUMENTS 6,494,558 B1 * 12/2002 Doval .................... B41J 29/393 347/19
7,537,304 B2 * 5/2009 Wu ........................ B41J 29/393 347/19

(Continued)

FOREIGN PATENT DOCUMENTS

| | | | |
|---|---|---|---|
| JP | 2005088439 | 4/2005 | |
| JP | 2013230693 | 11/2013 | |
| WO | WO-03057490 A1 * | 7/2003 | ............ B26D 11/00 |

OTHER PUBLICATIONS

"International Search Report (Form PCT/ISA/210) of PCT/JP2020/036644," mailed on Dec. 1, 2020, with English translation thereof, pp. 1-5.

*Primary Examiner* — John Zimmermann
(74) *Attorney, Agent, or Firm* — JCIPRNET

(57) ABSTRACT

Misalignment between landing positions is appropriately corrected. A printing device 10 that performs printing by an inkjet method includes an inkjet head 102, a carriage 100, a main scan driving part 18 (carriage drive mechanism), a detection mechanism 106, and a controller 30. The controller 30 detects a position where a concentration is the highest among concentrations of a correction pattern changing depending on positions in a main scanning direction, calculates magnitude of misalignment between a landing position of ink ejected from the inkjet head 102 when the carriage 100 moves to a first direction side and a landing position of the ink ejected from the inkjet head 102 when the carriage 100 moves to a second direction side based on a detection result of the position where the concentration is the highest, and corrects the misalignment between the landing positions based on a calculation result.

10 Claims, 7 Drawing Sheets

(56) References Cited

U.S. PATENT DOCUMENTS

| | | | | |
|---|---|---|---|---|
| 8,506,038 | B2 * | 8/2013 | Mizes | B41J 2/2114 347/15 |
| 2012/0033007 | A1 * | 2/2012 | Tomida | B41J 19/145 347/19 |
| 2013/0050324 | A1 * | 2/2013 | Uchida | B41J 29/38 347/14 |
| 2015/0097886 | A1 * | 4/2015 | Ohnishi | B41J 2/2135 347/14 |
| 2016/0279927 | A1 * | 9/2016 | Miyamoto | B41J 19/145 |
| 2016/0288527 | A1 * | 10/2016 | Hasegawa | B41J 2/2103 |
| 2017/0072680 | A1 * | 3/2017 | Yokota | B41J 2/2135 |

* cited by examiner (A)

(B)

PRINTING DEVICE AND CORRECTION METHOD

CROSS-REFERENCE TO RELATED APPLICATION

This application is a 371 application of the International PCT application serial no. PCT/JP2020/036644, filed on Sep. 28, 2020, which claims the priority benefits of Japan Patent Application No. 2019-186729, filed on Oct. 10, 2019. The entirety of each of the above-mentioned patent applications is hereby incorporated by reference herein and made a part of this specification.

TECHNICAL FIELD

This invention relates to a printing device and a correction method.

BACKGROUND ART

In related art, a printing device (inkjet printer) that performs printing by ejecting ink on a printing sheet is known (see Patent Literature 1). The inkjet printer described in Patent Literature 1 includes an inkjet head (ejection head) that ejects ink, a carriage on which the inkjet head is mounted, and a main scanning feed mechanism that reciprocates the carriage in a main scanning direction. The inkjet printer described in Patent Literature 1 is an inkjet printer having a so-called bidirectional printing function, and in this inkjet printer, the inkjet head ejects ink to perform printing on each of a forward path in which the carriage moves to one side in the main scanning direction and a backward path in which the carriage moves to the other side in the main scanning direction.

In the inkjet printer that performs the bidirectional printing, it is necessary to correct misalignment between a landing position of the ink ejected from the inkjet head on the forward path and a landing position of the ink ejected from the inkjet head on the backward path. In the inkjet printer described in Patent Literature 1, a test pattern for adjustment is printed on a printing sheet, and a correction amount for correcting the misalignment between the landing position of the ink ejected from the inkjet head on the forward path and the landing position of the ink ejected from the inkjet head on the backward path is determined.

The test pattern includes a plurality of correction patterns in which the correction amount is varied by a predetermined difference (1/1440 inch). Each correction pattern includes a first dot row group having a plurality of dot rows formed at a predetermined pitch (1/180 inch) in the main scanning direction, and a second dot row group having a plurality of dot rows formed at a predetermined pitch. The first dot row group is printed with the ink ejected from the inkjet head on the forward path, and the second dot row group is printed with the ink ejected from the inkjet head on the backward path. An ejection timing of the ink on the backward path is misaligned from an ejection timing of the ink on the forward path.

In the inkjet printer described in Patent Literature 1, a correction pattern in which relative positions of the first dot row group and the second dot row group are aligned the most is selected from among the plurality of correction patterns, and the correction amount associated with the selected correction pattern is a correction amount for correcting the misalignment between the landing position of the ink ejected from the inkjet head on the forward path and the landing position of the ink ejected from the inkjet head on the backward path. In the inkjet printer described in Patent Literature 1, the amount of misalignment in the main scanning direction between the dot row of the first dot row group and the dot row of the second dot row group is evaluated, and thus, the correction pattern in which the relative positions of the first dot row group and the second dot row group are aligned the most is selected from among the plurality of correction patterns.

In the inkjet printer described in Patent Literature 1, the amount of misalignment in the main scanning direction between the dot row of the first dot row group and the dot row of the second dot row group is evaluated by measuring concentrations of the correction pattern by a reflective optical sensor, and when a position where the concentration measured by the reflective optical sensor is the lowest (thinnest) is at a center of the correction pattern, the correction pattern in which the amount of misalignment in the main scanning direction between the dot row of the first dot row group and the dot row of the second dot row group is the smallest is specified as the correction pattern in which the relative positions of the first dot row group and the second dot row group are aligned the most.

CITATION LIST

Patent Literature

Patent Literature 1: Japanese Unexamined Patent Publication No. 2005-88439

SUMMARY OF THE INVENTION

Technical Problems

In the inkjet printer that performs the bidirectional printing, when there is no misalignment between the landing position of the ink on the forward path and the landing position of the ink on the backward path, the ink dot formed on the forward path and the ink dot formed on the backward path at the same position overlap without being misaligned. In this case, a range covered by the ink on a print medium is substantially the same as a case where the ink dots are formed only on one path of the forward path and the backward path. On the other hand, when there is the misalignment between the landing position of the ink on the forward path and the landing position of the ink on the backward path, the ink dots originally formed by overlapping at the same position are formed with the positions misaligned. As a result, a larger range of the print medium is covered with the ink than when there is no misalignment between the landing positions. Thus, in the case were the correction pattern in which the relative positions of the first dot row group and the second dot row group are aligned the most is selected as in Patent Literature 1, the correction pattern in which the concentration measured by the reflective optical sensor or the like is the lowest (thinnest) is usually detected.

However, the inventor of the present application has found that the misalignment between the landing positions may not be appropriately corrected by the method for detecting the position where the concentration is the lowest as in Patent Literature 1 by actually performing various experiments and the like. More specifically, when the concentrations of the pattern printed on the print medium are measured, the influence of light reflected in an unintended direction on the print medium may occur depending on the characteristics of the print medium and the ink to be used, and the like. In this case, an output indicating that the concentration is the lowest may be obtained at a position different from the position where the concentration is actually the lowest. There are a plurality of locations where similar low concentrations are measured, and it may be difficult to appropriately determine at which position the concentration is the lowest. As a result, the misalignment between the landing positions may not be appropriately corrected. Therefore, the invention provides a printing device and a correction method that can solve the above problems.

Solutions to Problems

The inventor of the present application has considered the correction of the misalignment between the landing positions by detecting a position other than the position where the concentration is the lowest for the pattern for correcting the misalignment between the landing positions. When the concentrations of the pattern printed on the print medium are measured, it has been found that the position where the concentration is the highest can be more reliably detected with higher accuracy than the position where the concentration is the lowest. In this case, it has been found that the misalignment between the landing positions can be appropriately corrected based on the detection result of the position where the concentration is the highest.

The inventor of the present application has found features necessary for obtaining such effects through further intensive research, and has reached the invention. In order to solve the above problems, the present invention provides a printing device that performs printing by an inkjet method. The device includes an inkjet head that ejects ink, a carriage on which the inkjet head is mounted, a carriage drive mechanism that moves the inkjet head together with the carriage by moving the carriage in a predetermined main scanning direction, a detection mechanism that detects concentrations of a correction pattern which is a pattern used for correcting misalignment between landing positions of the ink ejected from the inkjet head, and a controller that causes the inkjet head to print the correction pattern by controlling operations of the carriage drive mechanism and the inkjet head, and corrects the misalignment between the landing positions based on the concentrations of the correction pattern detected by the detection mechanism. When one side in the main scanning direction is defined as a first direction side and the other side in the main scanning direction is defined as a second direction side, the correction pattern is a pattern for correcting misalignment between a landing position of the ink ejected from the inkjet head when the carriage moves to the first direction side and a landing position of the ink ejected from the inkjet head when the carriage moves to the second direction side, and includes a plurality of first direction patterns which are a plurality of patterns printed by the inkjet head when the carriage moves to the first direction side and a plurality of second direction patterns which are a plurality of patterns printed by the inkjet head when the carriage moves to the second direction side, the plurality of first direction patterns and the plurality of second direction patterns are arrayed such that an overlapping method of the first direction pattern and the second direction pattern is different depending on positions in the main scanning direction by arraying the plurality of first direction patterns at a regular interval in the main scanning direction and arraying the plurality of second direction patterns at a regular interval in the main scanning direction wider than the interval between the first direction patterns, the concentrations of the correction pattern detected by the detection mechanism change depending on the positions in the main scanning direction by changing the overlapping method of the first direction pattern and the second direction pattern depending on the positions in the main scanning direction, and the controller detects a position where the concentration is the highest among the concentrations of the correction pattern changing depending on the positions in the main scanning direction, calculates magnitude of the misalignment between the landing position of the ink ejected from the inkjet head when the carriage moves to the first direction side and the landing position of the ink ejected from the inkjet head when the carriage moves to the second direction side based on a detection result of the position where the concentration is the highest, and corrects the misalignment between the landing positions based on a calculation result of the magnitude of the misalignment.

With this configuration, the misalignment between the landing positions can be appropriately corrected by detecting the position where the concentration is the highest among the concentrations of the correction pattern. More specifically, in this case, it is possible to detect the position where the first direction pattern and the second direction pattern are misaligned the most by detecting the position where the concentration is the highest among the concentrations of the correction pattern. In this case, since a positional relationship between each of the plurality of first direction patterns and each of the plurality of second direction patterns is known, it is possible to estimate the position where the first direction pattern and the second direction pattern are aligned the most based on the detection result of the position where the first direction pattern and the second direction pattern are misaligned the most. In this case, the misalignment between the landing positions can be appropriately corrected by estimating the position where the first direction pattern and the second direction pattern are aligned the most.

Here, in this configuration, correcting the misalignment between the landing positions can be considered as performing correction such that the amount of misalignment between the landing positions falls within a predetermined allowable range. In this configuration, the concentrations of the correction pattern change such that the concentration is the lowest at the position where the first direction pattern and the second direction pattern overlap with each other with the positions in the main scanning direction aligned the most and the concentration is the highest at the position where the first direction pattern and the second direction pattern overlap with each other with the positions in the main scanning direction misaligned the most. In the concentrations of the correction pattern, the distance between the position where the concentration is the highest and the position where the concentration is the lowest is the known predetermined distance. In this case, the controller estimates the position where the concentration is lowest in the correction pattern based on the detection result of the position where the concentration is highest and the known predetermined distance. The controller further calculates the distance between the preset reference position in the correction pattern and the position where the concentration is the lowest in the correction pattern based on the estimation result of the position where the concentration is the lowest. The misalignment between the landing positions is corrected such that the concentration of the correction pattern is the lowest at the reference position based on the calculation result of the distance. With this configuration, the misalignment between the landing positions can be appropriately corrected.

In this case, the known predetermined distance can be considered as a distance determined according to a difference between the interval between the first direction patterns and the interval between the second direction patterns, and the like. For example, it is considered that the center position of the correction pattern in the main scanning direction is used as the reference position. With this configuration, the misalignment between the landing positions can be appropriately corrected.

In this configuration, for example, it is considered that ultraviolet-curable ink is ejected in the inkjet head. In this case, the arrangement of the ink dots formed on the print medium tends to be uneven (mat shape) as compared to, for example, the case where the evaporation drying type ink is used. As a result, light is easily reflected in various directions on the print medium. Thus, in a case where the ultraviolet-curable ink is used, when an attempt is made to detect the position where the concentration is the lowest for the concentrations of the correction pattern, there is a concern that it is difficult to detect the correct position. As a result, there is a concern that it is difficult to appropriately correct the misalignment between the landing positions. On the other hand, with the above-described configuration, the misalignment between the landing positions can be appropriately corrected with higher accuracy even when the ultraviolet-curable ink is used by detecting the position where the concentration is the highest in the correction pattern.

In this configuration, for example, a pattern including a constant number of dots in the main scanning direction can be suitably used for each of the plurality of first direction patterns. As each of the plurality of second direction patterns, for example, a pattern including a certain number of dots in the main scanning direction can be suitably used. With this configuration, the misalignment between the landing positions can be appropriately corrected by using the plurality of first direction patterns and the plurality of second direction patterns. In this case, it is considered that the number of dots constituting the first direction pattern and the number of dots constituting the second direction pattern are equalized.

The concentrations of the correction pattern may be detected by dividing the detection range into the plurality of ranges. In this case, for example, the controller divides the detection range of the correction pattern by the detection mechanism into the plurality of divided detection ranges of a number equal to or greater than the number of first direction patterns included in the detection range of the correction pattern in the main scanning direction. The controller detects the position of the divided detection range in which the concentration is the highest among the plurality of divided detection ranges as the position where the concentration is the highest. With this configuration, the concentrations of the correction pattern can be appropriately detected. In this case, for example, it is considered that the detection range of the correction pattern is equally divided by the number of first direction patterns included in the detection range of the correction pattern in the main scanning direction. With this configuration, the concentration at the position of each of the first direction patterns can be appropriately detected.

In this configuration, the correction of the misalignment between the landing positions may be performed in stages divided into a plurality of stages with different accuracy, for example. In this case, the controller performs, as the correction of the misalignment between the landing positions, first accuracy correction for correcting the misalignment between the landing positions with first accuracy and second accuracy correction for correcting the misalignment between the landing positions with second accuracy higher than the first accuracy after the first accuracy correction is performed. In this case, the first accuracy correction can be considered as correction corresponding to coarse adjustment for adjusting the landing position with coarse accuracy. The second accuracy correction can be considered as correction corresponding to fine adjustment (main adjustment) which is detailed adjustment performed after the coarse adjustment. In this case, it is considered that a pattern different from the correction pattern used when the first accuracy correction is performed is used as the correction pattern used when the second accuracy correction is performed. With this configuration, the misalignment between the landing positions can be corrected stepwise and appropriately. Accordingly, it is possible to more appropriately correct the misalignment between the landing positions with high accuracy.

In this case, as the first direction pattern and the second direction pattern included in the correction pattern used when the first accuracy correction is performed, for example, it is considered that a pattern including a main scanning direction line that is a line extending in the main scanning direction is used. In this case, the main scanning direction line can be considered as, for example, a rectangular pattern in which a width in a sub scanning direction orthogonal to the main scanning direction is less than the width in the main scanning direction. It is considered that a pattern including a plurality of main scanning direction lines is used as each of the first direction patterns and each of the second direction patterns used in the first accuracy correction. As the first direction pattern and the second direction pattern included in the correction pattern used when the second accuracy correction is performed, for example, it is considered that a pattern including a sub scanning direction line that is a line extending in the sub scanning direction is used. In this case, the sub scanning direction line can be considered as, for example, a rectangular pattern in which the width in the main scanning direction is less than the width in the sub scanning direction. It is considered that a pattern including a plurality of sub scanning direction lines is used as each of the first direction patterns and each of the second direction patterns used in the second accuracy correction. With this configuration, the first accuracy correction and the second accuracy correction can be appropriately performed.

In this case, it is considered that the width in the main scanning direction of the sub scanning direction line included in the first direction pattern and the second direction pattern in the correction pattern used when the second accuracy correction is performed is less than the width in the main scanning direction of the main scanning direction line included in the first direction pattern and the second direction pattern in the correction pattern used when the first accuracy correction is performed. In this case, it is considered that the width in the sub scanning direction of the sub scanning direction line included in the first direction pattern and the second direction pattern in the correction pattern used when the second accuracy correction is performed is greater than the width in the sub scanning direction of the main scanning direction line included in the first direction pattern and the second direction pattern in the correction pattern used when the first accuracy correction is performed. With this configuration, the first accuracy correction and the second accuracy correction can be appropriately performed.

It is also considered that the correction method or the like having the same features as the features described above is used as the configuration of the invention. In this case, the same effects as described above can also be obtained.

Advantageous Effects of the Invention

According to the invention, the misalignment between the landing positions can be appropriately corrected.

DESCRIPTION OF EMBODIMENTS

Figure 1:
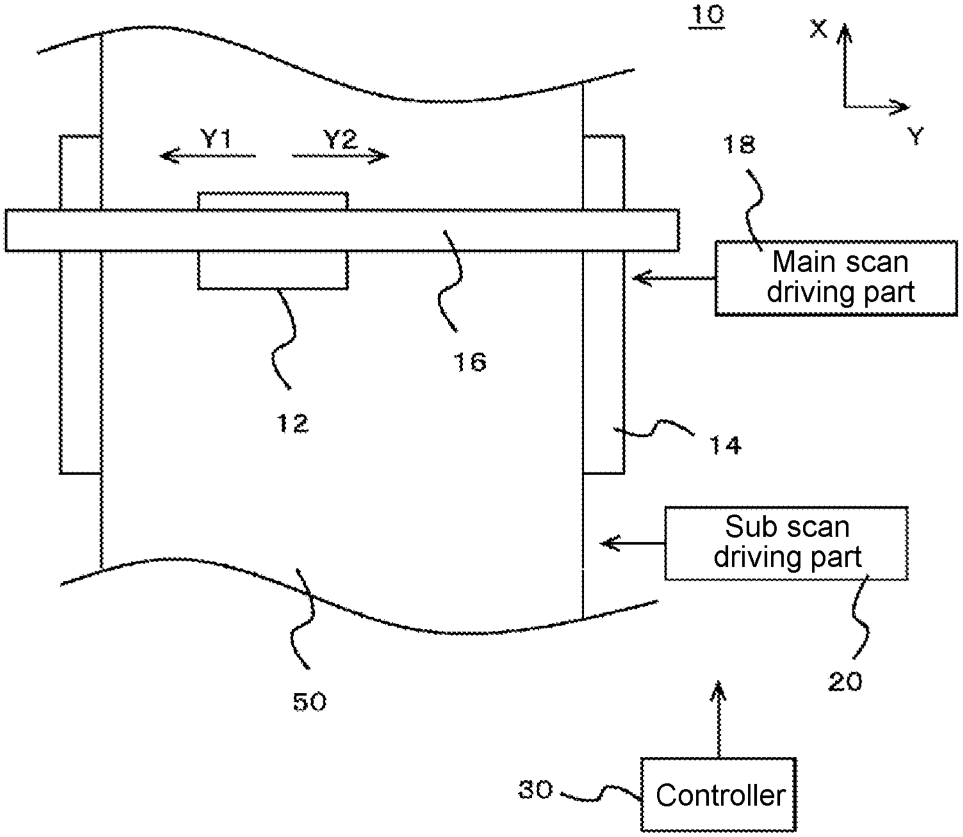
FIG. 1 is a drawing for describing a printing device 10 according to an embodiment of the invention. (A) of FIG. 1 shows an example of a configuration of a main part of the printing device 10. (B) of FIG. 1 shows an example of a configuration of a head part 12 in the printing device 10.
Figure 1:
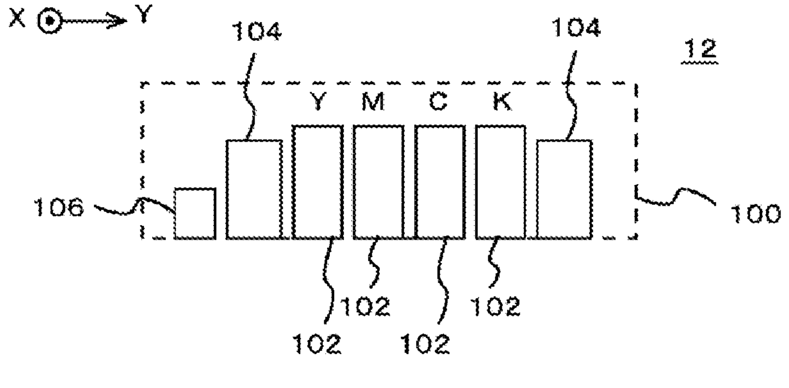

Hereinafter, an embodiment according to the invention will be described with reference to the drawings. FIG. 1 is a drawing for describing a printing device 10 according to the embodiment of the invention. (A) of FIG. 1 shows an example of a configuration of a main part of the printing device 10. (B) of FIG. 1 shows an example of a configuration of a head part 12 in the printing device 10. The printing device 10 is an inkjet printer that performs printing by an inkjet method, and performs printing on a print medium 50 such as paper or fabric. Except for the points to be described below, the printing device 10 in this example may have a configuration same as or similar to a known printing device. For example, the printing device 10 may further have a configuration same as or similar to the known printing device other than the configuration illustrated in FIG. 1.

In this example, the printing device 10 includes the head part 12, a platen 14, a guide rail 16, a main scan driving part 18, a sub scan driving part 20, and a controller 30. The head part 12 is a portion that ejects ink onto the print medium 50. In this example, as shown in (B) of FIG. 1, the head part 12 includes a carriage 100, a plurality of inkjet heads 102, a plurality of ultraviolet light sources 104, and a detection mechanism 106. Each configuration of the head part 12 will be described in more detail later. The platen 14 is a table-shaped member on which the print medium 50 is placed at the time of printing. The guide rail 16 is a rail member that guides the movement of the head part 12 in a predetermined main scanning direction. In this example, guiding the movement of the head part 12 means guiding the movement of the carriage 100 in the head part 12. The main scanning direction is a direction parallel to a Y direction shown in the drawing.

The main scan driving part 18 is a driving part that causes the plurality of inkjet heads 102 in the head part 12 to perform a main scan. In this case, the main scan is an operation of ejecting ink while relatively moving in the main scanning direction with respect to the print medium 50. More specifically, the main scan driving part 18 moves the plurality of inkjet heads 102 together with the carriage 100 by moving the carriage 100 in the head part 12 in the main scanning direction along the guide rail 16. In this case, the main scan driving part 18 further causes the plurality of inkjet heads 102 to perform the main scan by ejecting the ink from the plurality of inkjet heads 102 during the movement in the main scanning direction. In this example, the main scan driving part 18 is an example of a carriage drive mechanism that moves the inkjet heads 102 together with the carriage 100. In this case, moving the carriage 100 and the inkjet heads 102 can be considered as relatively moving with respect to the print medium 50, and the like.

In the following description, the main scanning direction is referred to as a left-right direction as necessary for the sake of convenience in description. One orientation (left orientation) in the left-right direction corresponding to an orientation toward a left side in (A) of FIG. 1 is referred to as a left direction. The other orientation (right orientation) in the left-right direction corresponding to an orientation toward a right side in (A) of FIG. 1 is referred to as a right direction. In this case, the left direction can be considered as an orientation on one side in the main scanning direction, and the like. The right direction can be considered as an orientation on the other side in the main scanning direction, and the like. In this example, the left direction is an example of a first direction. The right direction is an example of a second direction.

In this example, the main scan driving part 18 causes the plurality of inkjet heads 102 to perform the main scan (bidirectional main scan) in both orientations of the left direction and the right direction. In this case, the main scan in the orientation in the left direction can be considered as a main scan or the like in which the carriage 100 moves in the left direction. The main scan in the orientation in the right direction can be considered as a main scan or the like in which the carriage 100 moves in the right direction.

The sub scan driving part 20 is a driving part that causes the plurality of inkjet heads 102 in the head part 12 to perform a sub scan. In this case, the sub scan is an operation of relatively moving the plurality of inkjet heads 102 with respect to the print medium 50 in a sub scanning direction orthogonal to the main scanning direction (left-right direction). The sub scan can also be considered as a feeding operation of feeding the print medium 50 by relatively moving the plurality of inkjet heads 102 with respect to the print medium 50, and the like. The sub scan driving part 20 can also be considered as an example of a medium feeding mechanism. More specifically, in this example, the sub scan driving part 20 causes the plurality of inkjet heads 102 to perform the sub scan by conveying the print medium 50 in a conveyance direction parallel to the sub scanning direction between the main scans. In this example, the sub scanning direction is a direction parallel to an X direction shown in the drawing. In the following description, for the sake of convenience in description, the sub scanning direction is referred to as a front-back direction as necessary.

The controller 30 is configured to control an operation of each part of the printing device 10. For example, a configuration including arithmetic means such as a CPU, storage means such as a RAM or a ROM, and the like is considered as being used as the controller 30. In this example, the controller 30 is electrically connected to each part of the printing device 10, and controls the operation of each part of the printing device 10 by inputting and outputting electrical signals to and from each part of the printing device 10. More specifically, the controller 30 controls the operations of the main scan driving part 18 and the sub scan driving part 20 to cause the main sub scan driving part and the sub scan driving part to alternately and repeatedly perform the main scan in each direction of a reciprocating motion in which the carriage 100 moves in a reciprocating in the left-right direction and the feeding operation of the print medium 50 in the front-back direction. Thus, the controller 30 causes the printing device 10 to perform a printing operation at each position of the print medium 50.

In this example, the controller 30 further performs correction (hereinafter, referred to as landing position correction) of the misalignment between the landing positions of the ink ejected from the plurality of inkjet heads 102. More specifically, as the landing position correction, the controller 30 performs correction for reducing the misalignment between the landing positions caused by a difference in a movement orientation of the carriage 100 at the time of the main scan. In this case, the correction for reducing the misalignment between the landing positions can be considered as correction for setting the amount of misalignment (magnitude of the misalignment) to be within a predetermined allowable range, and the like. The landing position correction can be considered as, for example, performing correction such the amount of between the landing positions falls within the predetermined allowable range. An operation of correcting the misalignment between the landing positions will be described in more detail later.

Next, a configuration of the head part 12 will be described in more detail. As described above, in this example, the head part 12 includes the carriage 100, the plurality of inkjet heads 102, the plurality of ultraviolet light sources 104, and the detection mechanism 106. In this case, the carriage 100 is a holding member that holds other members in the head part 12. The carriage 100 can also be considered as an example of a member on which the inkjet heads 102 are mounted.

The plurality of inkjet heads 102 are ejection heads that eject ink by the inkjet method. For example, in the plurality of inkjet heads 102, inks of different colors are considered as inks to be ejected. More specifically, in this example, each of the plurality of inkjet heads 102 ejects ink of each color of, for example, yellow (Y color), magenta (M color), cyan (C color), and black (K color). With this configuration, various colors can be appropriately represented by using inks of a plurality of colors. Thus, color printing can be appropriately performed in the printing device 10.

In this example, the plurality of inkjet heads 102 are mounted on the carriage 100 in a state of being arrayed in the left-right direction with the positions in the front-back direction aligned. A nozzle row including a plurality of nozzles linearly arrayed in the front-back direction is formed in each of the inkjet heads 102. The nozzle row is formed on a lower surface of the inkjet head 102, and the inkjet head 102 ejects the ink downward. A plurality of nozzle rows arrayed in the left-right direction is formed in each inkjet head 102.

In this example, ultraviolet-curable ink (UV ink) is used as the ink ejected from each inkjet head 102. The ultraviolet-curable ink can be considered as ink cured by being irradiated with ultraviolet light. In this case, known ultraviolet-curable ink can be suitably used in each inkjet head 102.

An ink other than the ultraviolet-curable ink is also considered as being used as the ink used in the plurality of inkjet heads 102. In this case, for example, evaporation drying type ink, which is ink fixed to the print medium 50 by volatilizing and removing solvent, and the like can be suitably used. For example, a known aqueous ink, solvent ink, solvent UV ink, or the like can be suitably used as the evaporation drying type ink. In a modification example of the configuration of the inkjet head 102, the number of nozzle rows formed in the inkjet head 102 may be one. In a modification example of the configuration of the head part 12, the number of inkjet heads 102 mounted on the carriage 100 may be one or five or more.

The plurality of ultraviolet light sources 104 are light sources that emit ultraviolet light for curing the ultraviolet-curable ink. In this example, the plurality of ultraviolet light sources 104 are held by the carriage 100 so as to sandwich the plurality of inkjet heads 102 by being arranged on one side and the other side in the left-right direction with respect to the plurality of inkjet heads 102. In this case, the print medium 50 is considered as being irradiated with the ultraviolet light from the ultraviolet light sources 104 on a rear side in a movement direction according to the movement orientation of the carriage 100 at the time of the main scan. With this configuration, the ink which has landed on the print medium 50 can be appropriately cured in each main scan. In this example, the plurality of ultraviolet light sources 104 can be considered as an example of fixing means for fixing the ink to the print medium 50. In a modification example of the configuration of the head part 12, when ink other than the ultraviolet-curable ink is used, fixing means corresponding to a type of the ink is considered as being used.

The detection mechanism 106 is configured to detect a state of a test pattern printed at the time of correcting the landing position. In this example, the detection mechanism 106 detects concentrations of correction patterns that are test patterns printed at the time of correcting the landing position. In this case, the correction patterns can be considered as patterns or the like used to correct the misalignment between the landing positions of the ink ejected from the inkjet head 102. The detection mechanism 106 can also be considered as a concentration detection mechanism for detecting concentrations of a correction pattern printed for test the print medium 50. For example, a sensor or the like that detects a concentration without distinguishing between colors can be suitably used as the detection mechanism 106. With this configuration, the cost of the detection mechanism 106 can be appropriately reduced. For example, a so-called register mark sensor or the like used in a known printing device is considered as the detection mechanism 106. With this configuration, the cost of the detection mechanism 106 can be more appropriately reduced.

In this example, the detection mechanism 106 is a reflective optical sensor including a light emitting element and a light-receiving element. In this case, the light emitting element emits light toward the print medium 50 on which the correction pattern is printed. The light-receiving element receives the light emitted from the light emitting element and reflected by the print medium 50. The detection mechanism 106 detects a concentration at a position facing the detection mechanism 106 on the print medium 50 according to the control of the controller 30. An output signal indicating the detected result is output to the controller 30. In this case, when the concentration at the position where the concentration is detected by the detection mechanism 106 is high (when the concentration is high), since the reflectance of light decreases, the output (specifically, the output of the light-receiving element) of the detection mechanism 106 decreases. When the concentration at the position where the concentration is detected is low (when the concentration is low), since the reflectance of light increases, the output of the detection mechanism 106 increases.

In this example, the detection mechanism 106 relatively moves with respect to the print medium 50 by being mounted on the carriage 100 together with the plurality of inkjet heads 102 and the like. Thus, the detection mechanism 106 detects the concentration at each position of the correction pattern. According to this example, the concentrations of the correction pattern can be appropriately detected.

Next, the operation of correcting the misalignment between the landing positions will be described in more detail. As described above, in this example, the main scan driving part 18 causes the plurality of inkjet heads 102 to perform the main scan in both orientations of the left direction and the right direction. In this case, the printing device 10 can be considered as a printer or the like having a bidirectional printing function. The bidirectional printing function can be considered as a function of ejecting the ink from the inkjet heads 102 to perform printing on the print medium 50 in each of the main scan on a forward path in which the carriage 100 moves to one of the left direction and the right direction and the main scan on a backward path in which the carriage 100 moves to the other of the left direction and the right direction.

In this case, a difference may occur between the landing position of the ink ejected in the main scan on the forward path and the landing position of the ink ejected in the main scan on the backward path due to various factors. As a result, positions of ink dots to be originally formed at the same position are misaligned, and the quality of printing may deteriorate. Thus, when the main scans in the reciprocating motion are performed as in this example, it is important to perform the landing position correction (correction of the misalignment between the landing positions) in order to perform the printing at high quality. In this case, correcting the landing position can be considered as, for the ink dots to be formed at the same position, performing adjustment such that the difference between the position where the dot is formed in the main scan on the forward path and the position where the dot is formed in the main scan on the backward path falls within a predetermined allowable range. Such adjustment can be considered as adjustment for correcting misalignment between a landing position (hereinafter, referred to as a landing position in the movement in the left direction) of the ink ejected from the inkjet head 102 when the carriage 100 moves in the left direction and a landing position (hereinafter, referred to as a landing position in the movement in the right direction) of the ink ejected from the inkjet head 102 when the carriage 100 moves in the right direction.

The landing position correction is considered as being performed before the printing is performed on the print medium 50 for obtaining a desired printed matter. As described above, in this example, the printing device 10 performs the landing position correction by using a predetermined correction pattern. In this case, the controller 30 causes the inkjet heads 102 to print the correction pattern by controlling the operations of the main scan driving part 18, the sub scan driving part 20, and the inkjet heads 102. The controller 30 performs the landing position correction based on the concentrations of the correction pattern detected by the detection mechanism 106.

In this case, the correction pattern can be considered as a pattern or the like for correcting the misalignment between the landing position in the movement in the left direction and the landing position in the movement in the right direction. The correction pattern is preferably printed with ink with dark color (ink having a high color concentration) such as a black ink on the print medium 50 of a light reflective color such as a white printing sheet. With this configuration, the concentrations of the correction pattern can be appropriately detected.

More specifically, in this example, the printing device 10 performs adjustment for correcting the misalignment between the landing position of the ink on the forward path and the landing position of the ink on the backward path in two stages of coarse adjustment and fine adjustment (main adjustment) after the coarse adjustment. In this case, an operation of performing the coarse adjustment and the fine adjustment is an example of an operation of performing the landing position correction in stages divided into a plurality of stages with different accuracy. The coarse adjustment is an example of first accuracy correction for performing the landing position correction with first accuracy. The fine adjustment is an example of second accuracy correction for performing the landing position correction with second accuracy higher than the first accuracy after the first accuracy correction is performed. The coarse adjustment can be considered as correction for adjusting the landing position with coarse accuracy. The fine adjustment can be considered as correction corresponding to detailed adjustment performed after the coarse adjustment.

Figure 2:
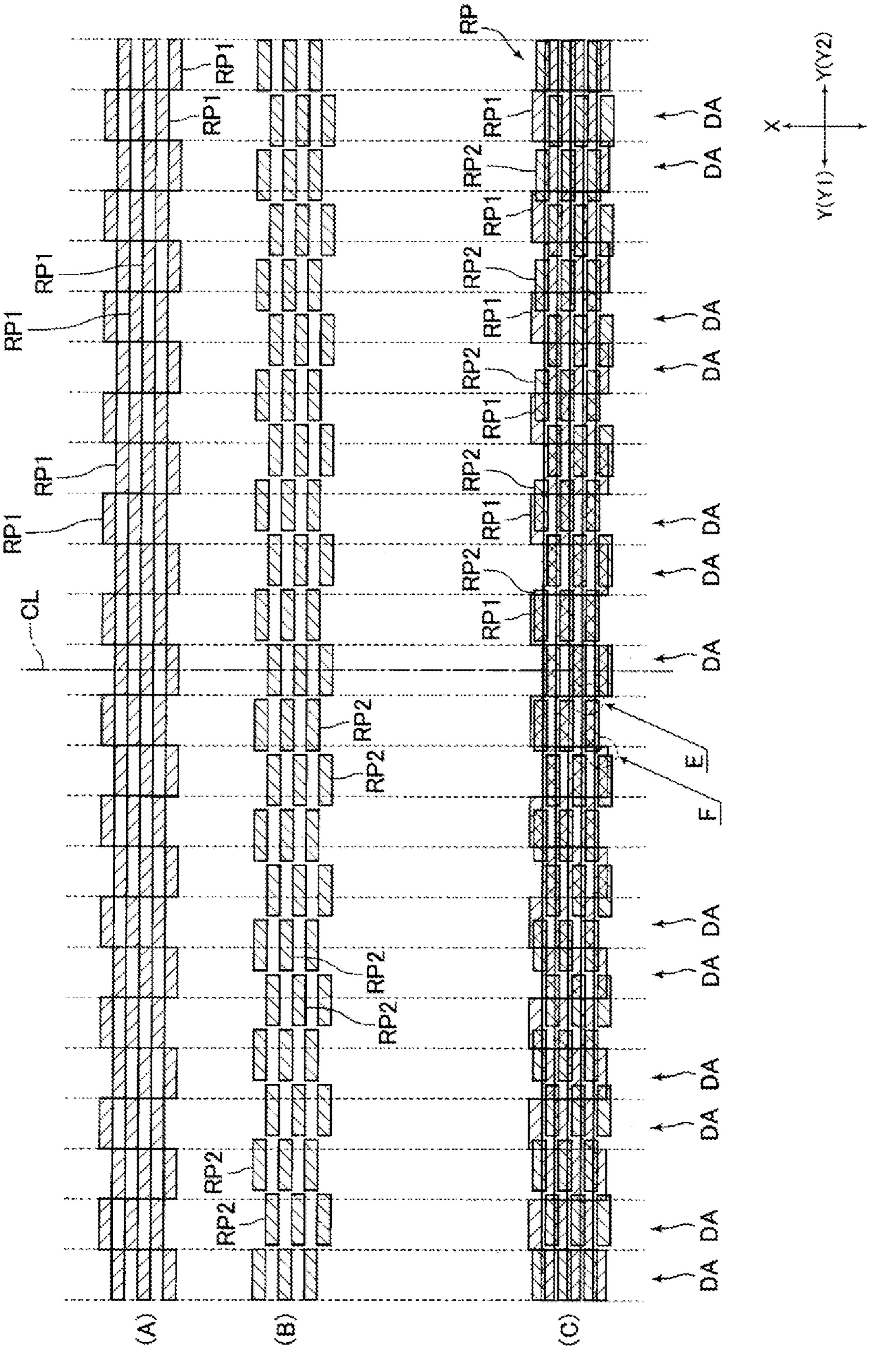
FIG. 2 is a drawing for describing a coarse adjustment operation. (A) to (C) of FIG. 2 are conceptual diagrams for describing a correction pattern RP printed by the printing device 10.
Figure 3:
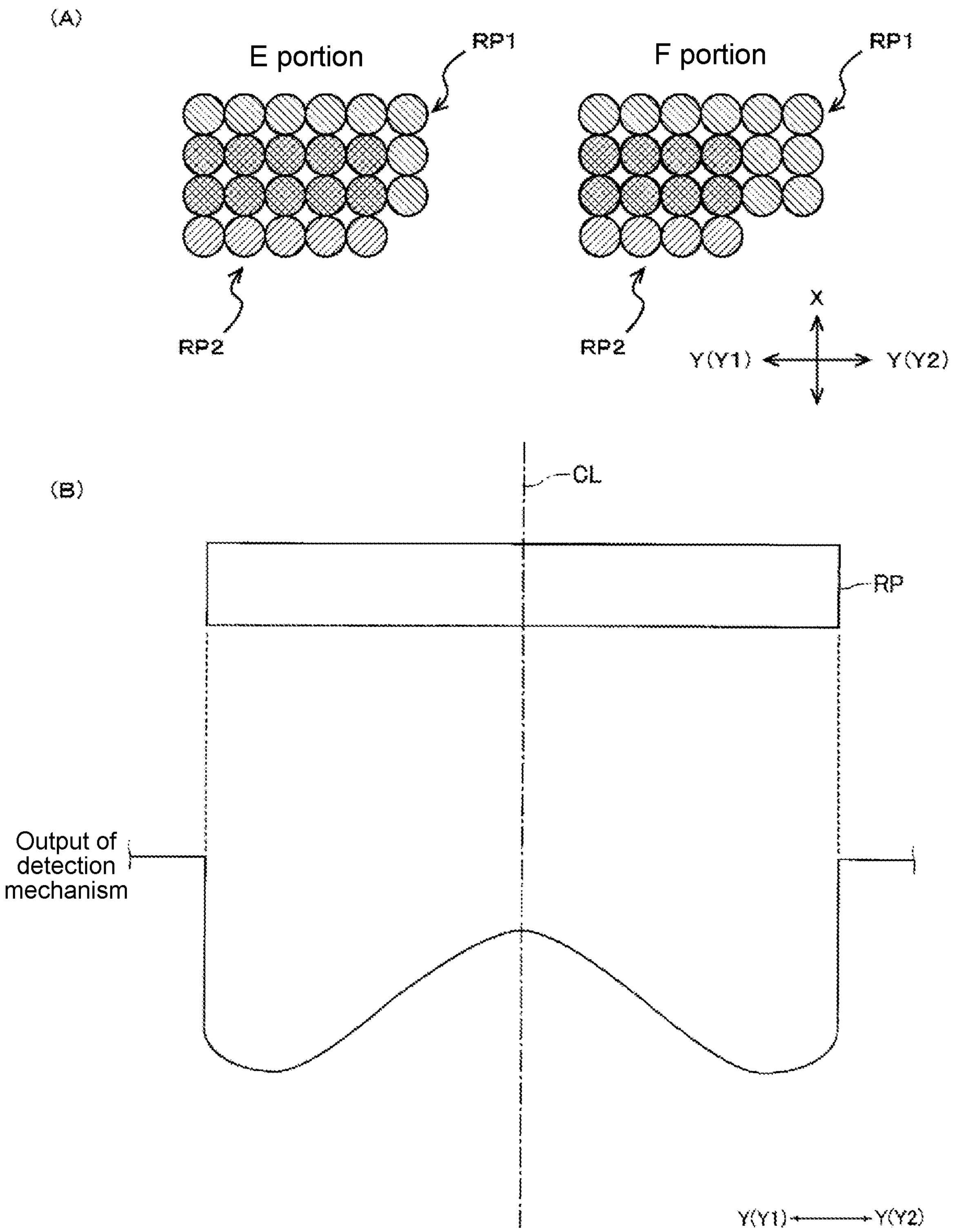
FIG. 3 is a drawing for describing a coarse adjustment operation. (A) of FIG. 3 is an enlarged view of an E portion and an F portion in FIG. 2. (B) of FIG. 3 is a drawing for describing a concentration distribution of the correction pattern RP.

Hereinafter, the coarse adjustment and the fine adjustment performed in this example will be described in more detail. FIGS. 2 and 3 are drawings for describing a coarse adjustment operation. (A) to (C) of FIG. 2 are conceptual diagrams for describing a correction pattern RP printed by the printing device 10. (A) of FIG. 2 illustrates an example of a plurality of first correction patterns RP1 included in the correction pattern RP. (B) of FIG. 2 illustrates an example of a plurality of second correction patterns RP2 included in the correction pattern RP. (C) of FIG. 2 is a drawing illustrating an example of the correction pattern RP. (C) of FIG. 2 can also be considered as a drawing illustrating an example of an overlapping method of the plurality of first correction patterns RP1 and the plurality of second correction patterns RP2 in the correction pattern RP. (A) of FIG. 3 is an enlarged view of an E portion and an F portion in FIG. 2. (B) of FIG. 3 is a drawing for describing a concentration distribution of the correction pattern RP, and illustrates an example of a concentration distribution when the landing position in the movement in the left direction and the landing position in the movement in the right direction coincide with each other. In the drawings subsequent to FIG. 2, as necessary, in the left-right direction (Y direction), the left direction which is one orientation of the left-right direction is Y1, and the right direction which is the other orientation of the left-right direction is Y2.

As illustrated in FIG. 2, the correction pattern RP used in this example includes the plurality of first correction patterns RP1 and the plurality of second correction patterns RP2. The plurality of first correction patterns RP1 are a plurality of patterns printed by the inkjet heads 102 when the carriage 100 moves in the left direction. In this example, the first correction pattern RP1 is an example of a first direction pattern. The plurality of second correction patterns RP2 are a plurality of patterns printed by the inkjet heads 102 when the carriage 100 moves in the right direction. In this example, the second correction pattern RP2 is an example of a second direction pattern. At the time of printing the second correction patterns RP2, the ink is ejected from the nozzle row that ejects the ink at the time of printing the first correction patterns RP1. The whole of the plurality of first correction patterns RP1 and the whole of the plurality of second correction patterns RP2 are printed at substantially the same position in the front-back and left-right directions.

For example, as illustrated in (A) of FIG. 3, the first correction pattern RP1 includes a certain number of dots. More specifically, the first correction pattern RP1 includes a plurality of dots arrayed at a constant pitch in the left-right direction and arrayed at a constant pitch in the front-back direction. The first correction pattern RP1 is formed in a rectangular shape as a whole. Similarly, the second correction pattern RP2 includes a certain number of dots. More specifically, similarly to the first correction pattern RP1, the second correction pattern RP2 includes a plurality of dots arrayed at a constant pitch in the left-right direction and arrayed at a constant pitch in the front-back direction. The second correction pattern RP2 is formed in a rectangular shape as a whole.

The pitch in the left-right direction of the plurality of dots in the first correction pattern RP1 is equal to the pitch in the left-right direction of the plurality of dots in the second correction pattern RP2, and the pitch in the front-back direction of the plurality of dots in the first correction pattern RP1 is equal to the pitch in the front-back direction of the plurality of dots in the second correction pattern RP2. The pitch in the left-right direction of the plurality of dots in the first correction pattern RP1 is equal to the pitch in the front-back direction of the plurality of dots in the first correction pattern RP1.

That is, the pitch in the left-right direction of the plurality of dots in the first correction pattern RP1 is equal to the pitch in the left-right direction of the plurality of dots in the second correction pattern RP2, and the pitch in the front-back direction of the plurality of dots in the first correction pattern RP1 is equal to the pitch in the front-back direction of the plurality of dots in the second correction pattern RP2. The pitches in the left-right direction and the front-back direction of the plurality of dots constituting the first correction pattern RP1 and the second correction pattern RP2 are defined as dot pitches. The dot pitch is equal to the pitch of the plurality of nozzles arrayed in the front-back direction in one nozzle row formed in the inkjet head 102.

The number of dots constituting the first correction pattern RP1 is equal to the number of dots constituting the second correction pattern RP2. More specifically, the number of dots arrayed in the left-right direction in the first correction pattern RP1 is equal to the number of dots arrayed in the left-right direction in the second correction pattern RP2, and the number of dots arrayed in the front-back direction in the first correction pattern RP1 is equal to the number of dots arrayed in the front-back direction in the second correction pattern RP2. That is, a width in the left-right direction of the first correction pattern RP1 is equal to a width in the left-right direction of the second correction pattern RP2, and a width in the front-back direction of the first correction pattern RP1 is equal to a width in the front-back direction of the second correction pattern RP2.

In this example, for example, as illustrated in (A) of FIG. 2, the plurality of first correction patterns RP1 arranged at the same position in the front-back direction are arrayed at a regular interval in the left-right direction. The plurality of first correction patterns RP1 arranged at the same position in the left-right direction are arrayed at a regular interval in the front-back direction. The interval between the first correction patterns RP1 in the left-right direction is equal to the width of the first correction pattern RP1 in the left-right direction. The interval between the first correction patterns RP1 in the front-rear direction is equal to the width of the first correction pattern RP1 in the front-rear direction.

In this example, for example, as illustrated in (B) of FIG. 2, the plurality of second correction patterns RP2 arranged at the same position in the front-back direction are arrayed at a regular interval in the left-right direction. The plurality of second correction patterns RP2 arranged at the same position in the left-right direction are arrayed at a regular interval in the front-back direction. The interval between the second correction patterns RP2 in the left-right direction is wider than the interval between the first correction patterns RP1 in the left-right direction. Specifically, the interval between the second correction patterns RP2 in the left-right direction is wider than the interval between the first correction patterns RP1 in the left-right direction by one dot pitch. The interval between the second correction patterns RP2 in the front-rear direction is equal to the interval between the first correction patterns RP1 in the front-rear direction.

In this example, for example, as illustrated in (C) of FIG. 2 and the like, when the landing position in the movement in the left direction coincides with the landing position in the movement in the right direction, the first correction pattern RP1 and the second correction pattern RP2 arranged at a center position CL in the left-right direction of the correction pattern RP are arranged at the same position in the left-right direction. At this time, in the first correction pattern RP1 and the second correction pattern RP2 adjacent to the left side of the first correction pattern RP1 and the second correction pattern RP2 arranged at the center position CL, the second correction pattern RP2 is arranged on the left side of the first correction pattern RP1 by one dot pitch as illustrated as an enlarged view of the E portion in (A) of FIG. 3. In the first correction pattern RP1 and the second correction pattern RP2 adjacent to the left side of the first correction pattern RP1 and the second correction pattern RP2, the second correction pattern RP2 is arranged on the left side of the first correction pattern RP1 by two dot pitches as illustrated as an enlarged view of the F portion in (A) of FIG. 3. At this time, the first correction pattern RP1 and the second correction pattern RP2 arranged at the center position CL in the left-right direction of the correction pattern RP are misaligned by one dot pitch in the front-back direction.

As described above, in this example, when the landing position in the movement in the left direction coincides with the landing position in the movement in the right direction, the first correction pattern RP1 and the second correction pattern RP2 arranged at the center position CL in the left-right direction of the correction pattern RP are arranged at the same position in the left-right direction. At this time, the first correction pattern RP1 and the second correction pattern RP2 arranged at the center position CL in the left-right direction of the correction pattern RP are misaligned by one dot pitch in the front-back direction. The interval between the second correction patterns RP2 in the left-right direction is wider than the interval between the first correction patterns RP1 in the left-right direction by one dot pitch. The first correction pattern RP1 and the second correction pattern RP2 are printed with ink with a high concentration such as black ink.

Thus, when the landing position in the movement in the left direction coincides with the landing position in the movement in the right direction, the concentration of the correction pattern RP is the lowest at the center position CL of the correction pattern RP. At this time, the concentration of the correction pattern RP increases from the center position CL of the correction pattern RP toward the outside in the left-right direction up to a predetermined position of the correction pattern RP in the left-right direction. Accordingly, in a case where the landing position in the movement in the left direction coincides with the landing position in the movement in the right direction, when the concentration of the entire region in the left-right direction of the correction pattern RP is detected by the detection mechanism 106, the output of the detection mechanism 106 fluctuates, for example, as illustrated in (B) of FIG. 3. That is, the output of the detection mechanism 106 is maximized when the detection mechanism 106 detects the center position CL of the correction pattern RP, and is minimized when the detection mechanism 106 detects two predetermined locations of the correction pattern RP that are separated from the center position CL by an equal distance.

As described above, in this example, a concentration of a predetermined range of the correction pattern RP in the left-right direction is detected by the detection mechanism 106 that moves in the left-right direction together with the carriage 100. In this case, the center position CL in the left-right direction of the correction pattern RP and a center position in the left-right direction of a detection range of the correction pattern RP by the detection mechanism 106 coincide with each other. That is, in this example, when the landing position in the movement in the left direction coincides with the landing position in the movement in the right direction, the concentration of the correction pattern RP is the lowest at the center position in the left-right direction of the detection range of the correction pattern RP.

On the other hand, when the landing position in the movement in the left direction and the landing position in the movement in the right direction are misaligned, the concentration of the correction pattern RP is the lowest at a position different from the center position in the left-right direction of the detection range of the correction pattern RP. In this case, when the adjustment is performed such that the concentration is the lowest at the center position in the left-right direction of the detection range of the correction pattern RP based on the detection result of the concentration of the correction pattern RP, the landing position in the movement in the left direction and the landing position in the movement in the right direction coincide with each other in the adjusted state.

More specifically, as described above, in the correction pattern RP of this example, the plurality of first correction patterns RP1 are arrayed at a regular interval in the left-right direction. The plurality of second correction patterns RP2 are arrayed at a regular interval wider than the interval between the first correction patterns RP1 in the left-right direction. Thus, the plurality of first correction patterns RP1 and the plurality of second correction patterns RP2 are arrayed such that an overlapping method of the first correction pattern RP1 and the second correction pattern RP2 is different depending on the position in the left-right direction. In this case, the overlapping method of the first correction patterns RP1 and the second correction patterns RP2 change depending on the position in the left-right direction, and thus, the concentration of the correction pattern RP detected by the detection mechanism 106 changes depending on the position in the left-right direction. More specifically, in this example, the concentration of the correction pattern RP changes such that the concentration is the lowest at the position where the first correction pattern RP1 and the second correction pattern RP2 overlap with each other with the positions in the left-right direction aligned the most and the concentration is the highest at the position where the first correction pattern RP1 and the second correction pattern RP2 overlap with each other with the positions in the left-right direction misaligned the most.

In this example, the controller 30 estimates the position where the concentration is the lowest based on the detection result of the concentrations of the correction pattern RP as will be described in detail below. The adjustment is performed such that the concentration is the lowest at the center position in the left-right direction of the detection range of the correction pattern RP based on the estimation result. With this configuration, the landing position correction may not be appropriately performed.

Here, the operation of performing the landing position correction will be described in more detail. As described above, in this example, the concentrations of the correction pattern RP printed on the print medium 50 are detected, and the position where the concentration is the lowest is estimated. In this case, in the simplest manner, the position where the output is the largest in the detection result of the concentrations of the correction pattern RP may be considered as the position where the concentration is the lowest as it is.

However, when the concentrations of the correction pattern RP printed on the print medium 50 are measured, the influence of light reflected in an unintended direction on the print medium 50 may occur depending on the characteristics of the print medium 50 and the ink to be used, and the like. In this case, an output indicating that the concentration is the lowest may be obtained at a position different from the position where the concentration is actually the lowest. For example, due to the same reason, there may be a plurality of locations where similar low concentrations are measured, and it may be difficult to appropriately determine at which position the concentration is the lowest. In these cases, the position where the concentration is actually the lowest in the correction pattern RP cannot be correctly detected, and thus, the landing position correction may not be appropriately performed.

On the other hand, the inventor of the present application has found through intensive research that, when the concentrations of the correction pattern RP printed on the print medium 50 are measured, the position with the highest concentration can be more reliably detected with higher accuracy than the position where the concentration is the lowest. In this case, the position where the concentration is actually the lowest in the correction pattern RP can be appropriately estimated by further based on the arrangement of the plurality of first correction patterns RP1 and the plurality of second correction patterns RP2. The landing position correction can be appropriately performed by using the estimation result.

Figure 4:
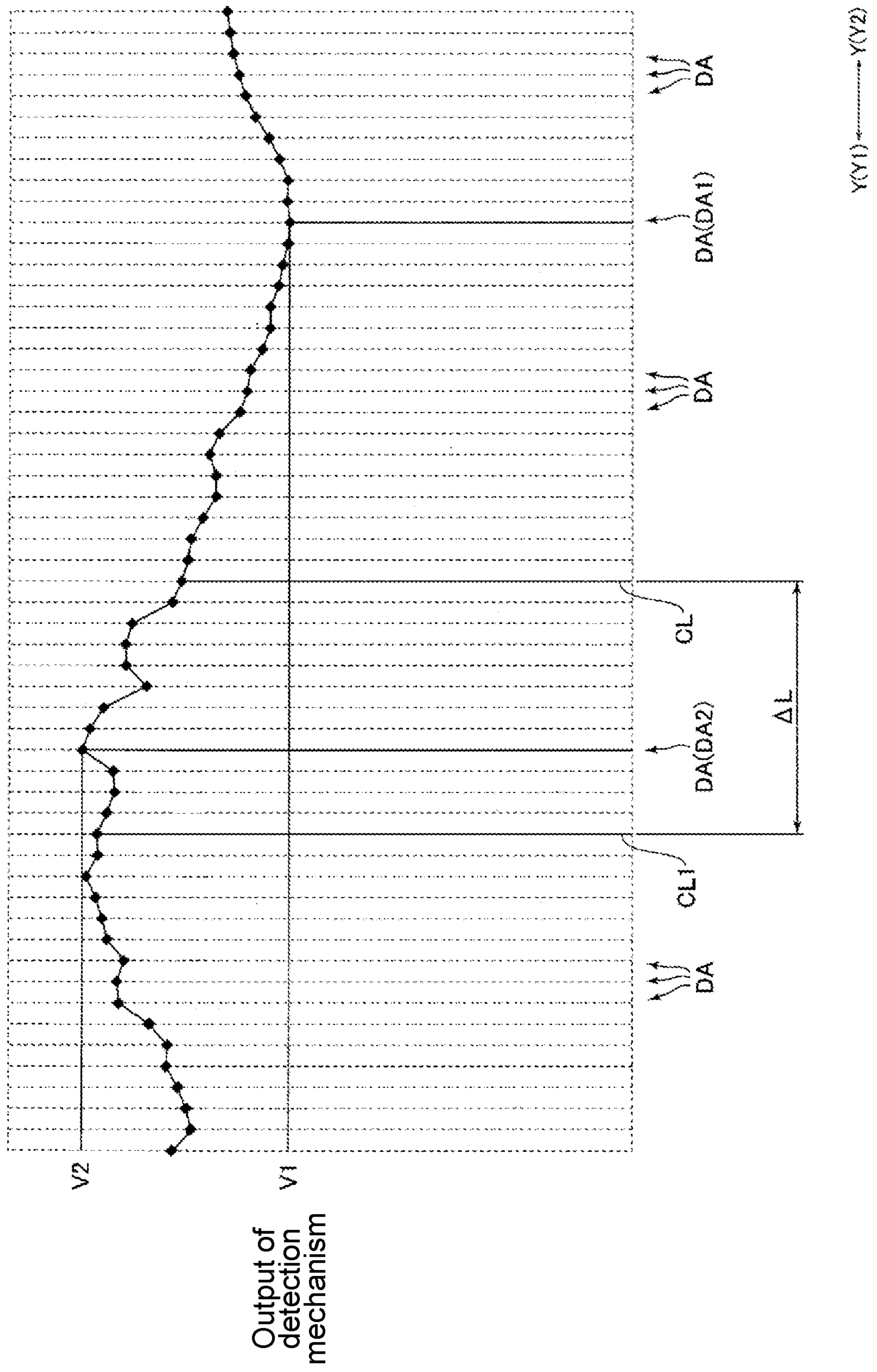
FIG. 4 is a drawing for describing an operation of correcting misalignment between landing positions in more detail.

FIG. 4 is a drawing for describing the operation of correcting the misalignment between the landing positions in more detail, and illustrates an example of the coarse adjustment operation performed in this example. As described above, in this example, the coarse adjustment and the fine adjustment are performed in order to correct the misalignment between the landing position in the movement in the left direction and the landing position in the movement in the right direction. In the coarse adjustment, for example, the correction pattern RP shown in FIG. 3 is printed for test on the print medium 50. In this case, the carriage 100 is moved in the left direction to print the plurality of first correction patterns RP1, and the carriage 100 is moved in the right direction to print the plurality of second correction patterns RP2. After the correction pattern RP is printed, the carriage 100 is moved to detect the concentrations of the correction pattern RP by the detection mechanism 106. In this case, when the landing position in the movement in the left direction and the landing position in the movement in the right direction are misaligned, the output of the detection mechanism 106 fluctuates, for example, as illustrated in FIG. 4 in the detection range of the correction pattern RP by the detection mechanism 106.

After the concentrations of the correction pattern RP are detected by the detection mechanism 106, the controller 30 divides the detection range of the correction pattern RP by the detection mechanism 106 into a number equal to or greater than the number of first correction patterns RP1 included in the detection range of the correction pattern RP in the left-right direction. More specifically, in this example, the controller 30 equally divides the detection range of the correction pattern RP by the number of first correction patterns RP1 included in the detection range of the correction pattern RP in the left-right direction. In this case, the operation of the controller 30 can also be considered as an operation of equally dividing the detection range of the correction pattern RP in the left-right direction by the width in the left-right direction of the first correction pattern RP1. With this configuration, arithmetic processing in the controller 30 can be simplified as compared with a case where the detection range of the correction pattern RP is equally divided by a number exceeding the number of first correction patterns RP1 included in the detection range of the correction pattern RP in the left-right direction.

More specifically, for example, in the case illustrated in FIG. 4, the number of first correction patterns RP1 included in the detection range of the correction pattern RP is 57. In this case, the controller 30 equally divides the detection range of the correction pattern RP into 57 in the left-right direction. In the following description, the detection ranges of the correction pattern RP equally divided in the left-right direction are referred to as divided detection ranges DA. In this case, the detection range of the correction pattern RP can be considered as being equally divided into a plurality of divided detection ranges DA in the left-right direction.

In the drawing, the divided detection range DA (hereinafter, referred to as a first divided detection range DA1) denoted by DA1 is a divided detection range DA in which the output of the detection mechanism 106 is the smallest. The divided detection range DA (hereinafter, referred to as a second divided detection range DA2) denoted by DA2 is a divided detection range DA in which the output of the detection mechanism 106 is the largest. In this case, when the output of the detection mechanism 106 is considered as accurately indicating a concentration of the divided detection range DA, it can be considered that the position with the highest concentration in the correction pattern RP corresponds to the first divided detection range DA1 and the position with the lowest concentration in the correction pattern RP corresponds to the second divided detection range DA2.

However, as described above, when the concentrations of the correction pattern RP are measured, an output indicating that the concentration is the lowest may be obtained at a position different from the position where the concentration is actually the lowest. More specifically, in the case shown in FIG. 4, the position where the concentration is actually the lowest is a position denoted by a reference sign CL1 (hereinafter, referred to as a minimum concentration position CL1). In this case, when the landing position correction is performed on the assumption that the position with the lowest concentration in the correction pattern RP corresponds to the second divided detection range DA2, the correction cannot be appropriately performed.

On the other hand, as described above, when the concentrations of the correction pattern RP are measured, the position with the highest concentration can be detected with higher accuracy than the position with the lowest concentration. More specifically, in the case illustrated in FIG. 4, the concentration is actually the highest in the first divided detection range DA1. In this example, the plurality of first correction patterns RP1 and the plurality of second correction patterns RP2 constituting the correction pattern RP are printed in the predetermined arrangement described above. In this case, a positional relationship of the plurality of first correction patterns RP1 and the plurality of second correction patterns RP2 can be considered as being known. As a result, in the concentrations of the correction pattern RP, a distance between the position where the concentration is actually the highest and the position where the concentration is actually the lowest can be considered as a known predetermined distance. More specifically, in this example, a distance between the first divided detection range DA1 and the minimum concentration position CL1 can be considered as a known predetermined distance. In this case, such a known predetermined distance can be considered as a distance determined according to a difference between the interval between the first correction pattern RP1 and the interval between the second correction pattern RP2, or the like. In this case, when the first divided detection range DA1 corresponding to the position where the concentration is actually the highest is known, the minimum concentration position CL1 can be appropriately estimated based on the first divided detection range DA1 and the known predetermined distance.

More specifically, in this example, the controller 30 specifies the first divided detection range DA1 based on the output of the detection mechanism 106. The minimum concentration position CL1 is estimated based on the position of the first divided detection range DA1 and the known predetermined distance. The controller 30 calculates the amount of misalignment $\Delta L$ between the minimum concentration position CL1 specified by estimation and the center position (that is, the center position CL in the left-right direction of the correction pattern RP) in the left-right direction of the detection range of the correction pattern RP. The controller 30 performs predetermined correction based on the calculated amount of misalignment $\Delta L$. More specifically, in this case, the controller 30 specifies the amount of misalignment $\Delta L$ as the amount of misalignment between the landing position in the movement in the left direction and the landing position in the movement in the right direction, and performs the correction by the amount of misalignment $\Delta L$. The correction of the amount of misalignment $\Delta L$ may be manually performed by an operator of the printing device 10. In this case, the operation of the controller 30 can be considered as, for example, performing the correction operation according to an operation of the operator.

According to this example, even when the output of the detection mechanism 106 indicating that the concentration is the lowest at the position different from the position where the concentration is actually the lowest is obtained, the landing position correction can be appropriately performed. Accordingly, the landing position correction can be appropriately performed with high accuracy even when the influence of light and the like reflected in an unintended direction on the print medium 50 occurs depending on the characteristics of the print medium 50 and the ink to be used, and the like.

Figure 5:
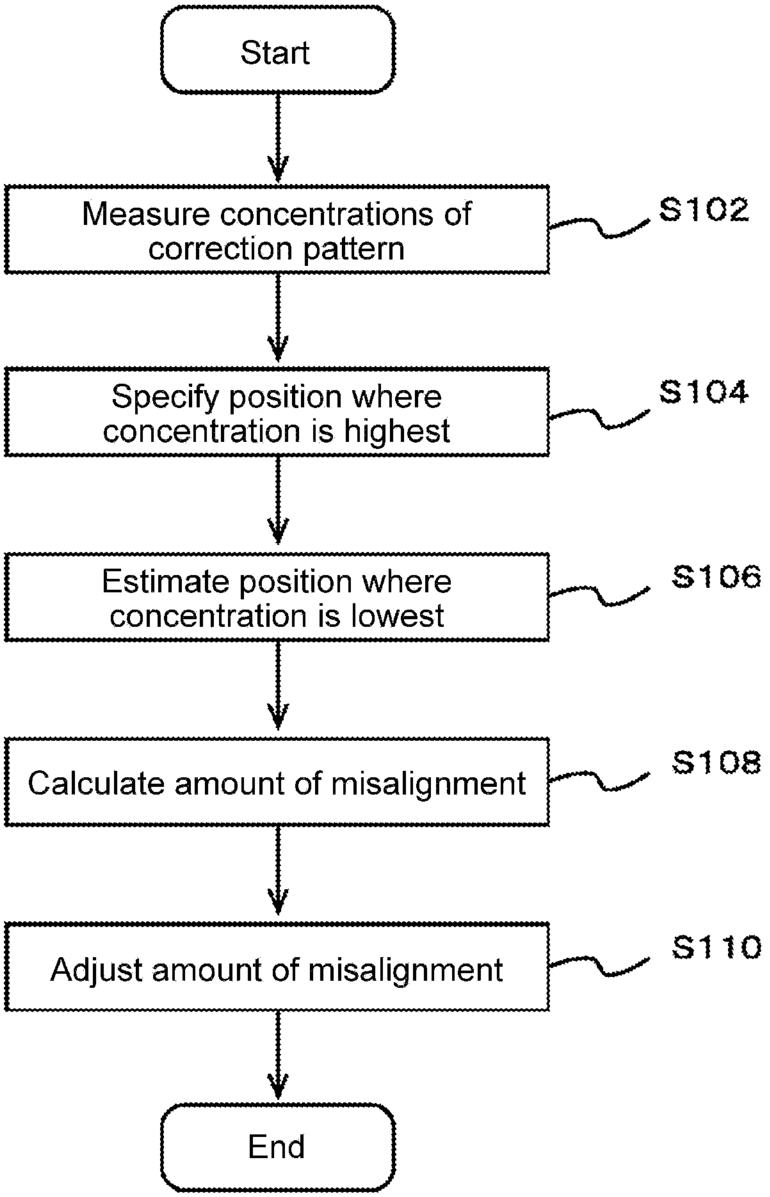
FIG. 5 is a flowchart illustrating an example of an operation of landing position correction.

Next, the operation of the landing position correction performed in this example will be described in more detail with reference to a flowchart. FIG. 5 is a flowchart illustrating an example of the operation of the landing position correction.

In this example, when the landing position correction is performed, the correction pattern RP is printed and the concentrations of the correction pattern RP are measured as described above (S102). The position with the highest concentration in the correction pattern RP is specified based on the measurement result of the concentration (S104). More specifically, in the operation of step S104, the controller 30 of the printing device 10 detects, as the position where the concentration is the highest, the position of the first divided detection range DA1 which is the divided detection range DA with the highest concentration among the plurality of divided detection ranges DA as described above with reference to FIG. 4, for example. In this case, detecting the position where the concentration is the highest among the concentrations of the correction pattern RP can be considered as detecting the position where the first correction pattern RP1 and the plurality of second correction patterns RP2 are misaligned the most in the correction pattern RP. The position of the first divided detection range DA1 can be considered as the detection result or the like of the position where the first correction pattern RP1 and the plurality of second correction patterns RP2 are misaligned the most.

As described above, in the case of this example, the distance between the position where the concentration is the highest and the position where the concentration is the lowest in the correction pattern RP can be considered as the known predetermined distance. The controller 30 estimates the minimum concentration position CL1 which is the position with the lowest concentration in the correction pattern RP based on the known predetermined distance and the position of the first divided detection range DA1 (S106). In this case, estimating the minimum concentration position CL1 can be considered as calculating the minimum concentration position CL1 based on the known predetermined distance and the first divided detection range DA1. The minimum concentration position CL1 can be considered as a position where the first correction pattern RP1 and the plurality of second correction patterns RP2 are aligned the most.

After the minimum concentration position CL1 is specified by such estimation, the amount of misalignment ΔL between the minimum concentration position CL1 and the center position CL of the correction pattern RP is calculated (S108). In this case, the center position CL of the correction pattern RP can be considered as an example of a reference position set in advance in the correction pattern RP. In this case, the amount of misalignment ΔL can be considered as an example of a distance between the reference position in the correction patterns and the position where the concentration is the lowest in the correction patterns. In this example, the center position of the correction pattern RP in the left-right direction can be considered as being used as the reference position. In this case, when the operations of steps S102 to S108 described above are collectively considered, it can be considered that the controller 30 detects the position where the concentration is the highest from among the concentrations of the correction pattern RP that change depending on the position in the left-right direction and calculates the magnitude of the misalignment between the landing position in the movement in the left direction and the landing position in the movement in the right direction based on the detection result of the position where the concentration is the highest.

Subsequently to the operations up to step S108, the controller 30 performs the landing position correction by performing the adjustment corresponding to the amount of misalignment ΔL based on the calculation result of the amount of misalignment ΔL (S110). In this case, the adjustment corresponding to the amount of misalignment ΔL can be considered as adjustment such that the amount of misalignment ΔL falls within a predetermined allowable range and the like. More specifically, in this case, the controller 30 performs the landing position correction such that the center position CL of the correction pattern RP coincides with the minimum concentration position CL1. Such a correction operation can be considered as an operation of the landing position correction such that the concentration of the correction pattern RP is the lowest at the reference position based on the calculation result of the amount of misalignment ΔL.

According to this example, the landing position correction can be appropriately performed by detecting the position where the concentration is the highest among the concentrations of the correction pattern RP. In this case, more specifically, for example, the coarse adjustment at predetermined accuracy can be appropriately performed by performing the landing position correction by the operation described with reference to FIG. 5 and the like by using the correction pattern RP described with reference to FIG. 2 and the like. In this case, the landing position correction can be performed with higher accuracy by further performing the fine adjustment (main adjustment). Thus, the fine adjustment performed in this example will be described in more detail below. Except for the points to be described below, the fine adjustment in this example can be performed in the same manner as or similar to the coarse adjustment described above.

In this example, the correction pattern RP including the plurality of first correction patterns RP1 and the plurality of second correction patterns RP2 is also used for the fine adjustment. In this case, the plurality of first correction patterns RP1 are arranged in the left-right direction with the positions in the front-rear direction aligned. The plurality of second correction patterns RP2 are arranged in the left-right direction with the positions in the front-rear direction aligned. In this case, the plurality of first correction patterns RP1 arranged at the same position in the front-back direction are arrayed at a regular interval in the left-right direction. The plurality of second correction patterns RP2 arranged at the same position in the front-back direction are arrayed at a regular interval in the left-right direction. Similarly to the correction pattern RP for the coarse adjustment, in the correction pattern RP for the fine adjustment, the interval between the second correction patterns RP2 in the left-right direction is wider than the interval between the first correction patterns RP1 in the left-right direction. More specifically, in the correction pattern RP for the fine adjustment, the interval between the second correction patterns RP2 in the left-right direction is wider than the interval between the first correction patterns RP1 in the left-right direction by a distance less than one dot pitch.

In this case, the patterns used as the first correction pattern RP1 and the second correction pattern RP2 are preferably different between the correction pattern RP for the fine adjustment and the correction pattern RP for the coarse adjustment. More specifically, in this example, a pattern different from the correction pattern RP used when the coarse adjustment is performed is used as the correction pattern RP used when the fine adjustment is performed. As the first correction pattern RP1 and the second correction pattern RP2 in the correction pattern RP used when the fine adjustment is performed, for example, patterns to be described below with reference to FIGS. 6 and 7 are used.

Figure 6:
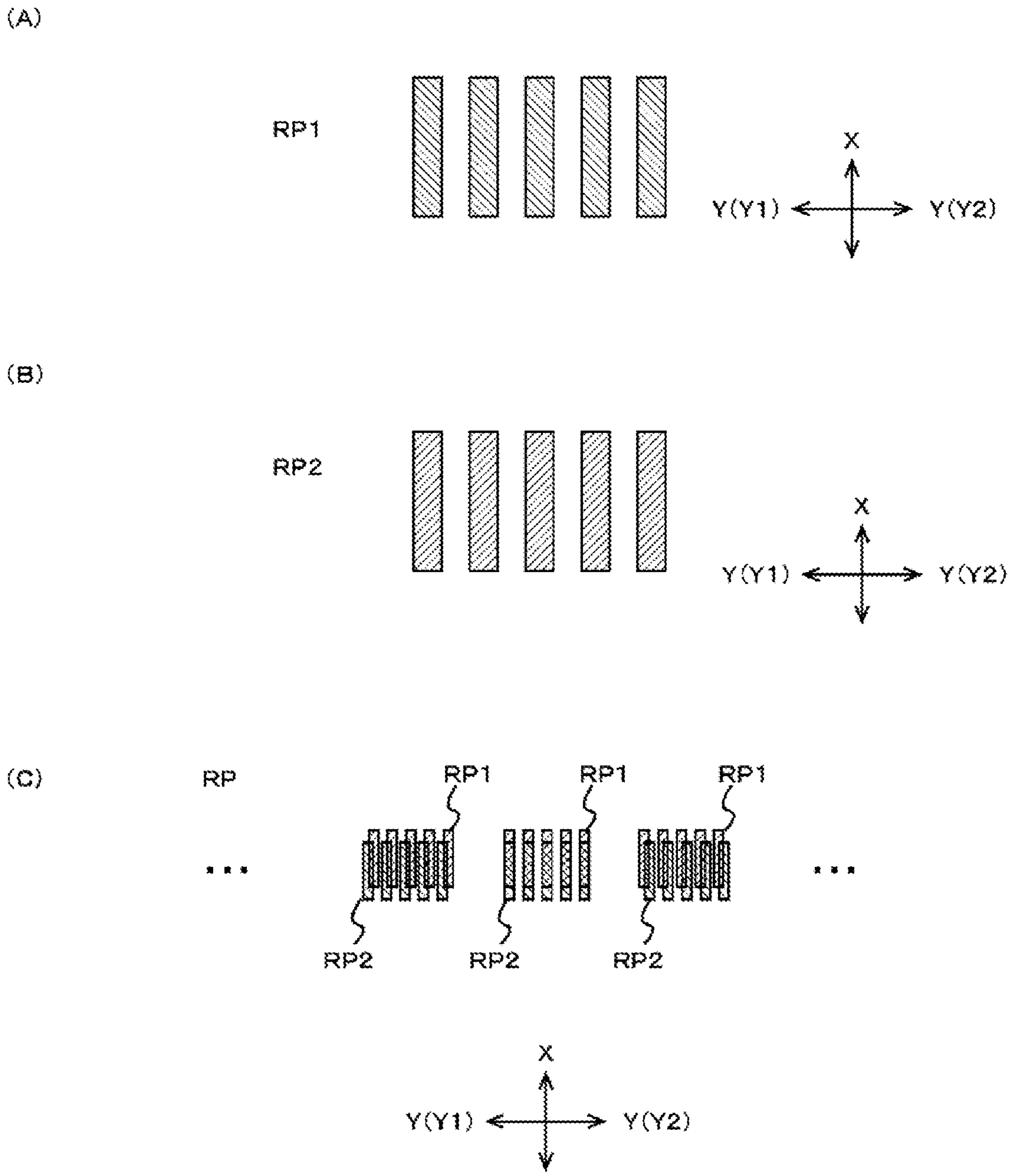
FIG. 6 is a drawing for describing fine adjustment performed in this example in more detail. (A) of FIG. 6 illustrates an example of a first correction pattern RP1. (B) of FIG. 6 illustrates an example of a second correction pattern RP2. (C) of FIG. 6 illustrates an example of an overlapping method of a plurality of first correction patterns RP1 and a plurality of second correction patterns RP2 in the correction pattern RP.
Figure 7:
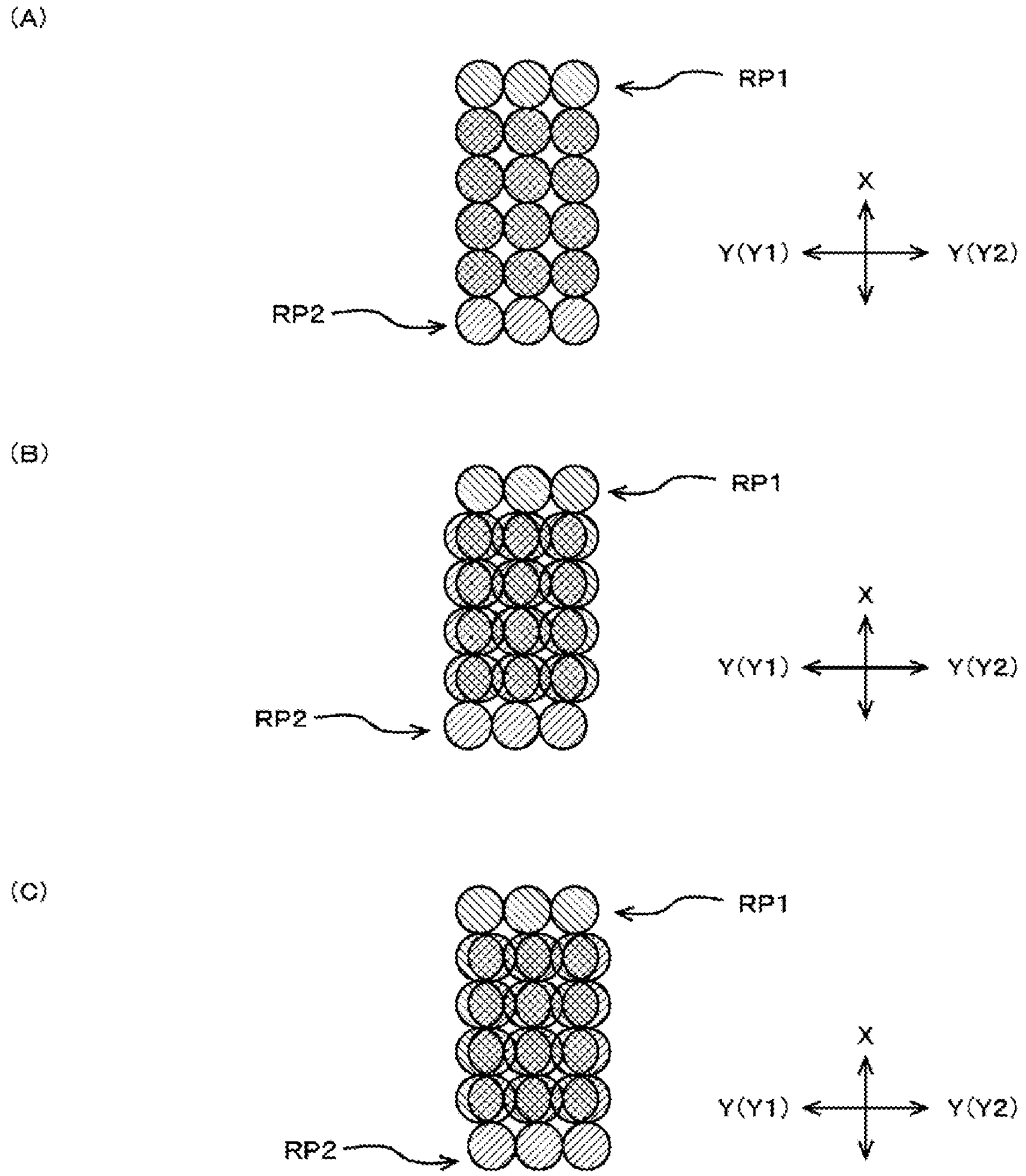
FIG. 7 is a drawing for describing fine adjustment performed in this example in more detail. (A) to (C) of FIG. 7 illustrate an example of a difference in the overlapping method between the first correction patterns RP1 and the second correction patterns RP2 depending on positions in a left-right direction.

FIGS. 6 and 7 are drawings for describing the fine adjustment performed in this example in more detail, and illustrate examples of the first correction pattern RP1 and the second correction pattern RP2 in the correction pattern RP used when the fine adjustment is performed. (A) of FIG. 6 illustrates an example of a first correction pattern RP1. (B) of FIG. 6 illustrates an example of a second correction pattern RP2. (C) of FIG. 6 illustrates an example of an overlapping method of a plurality of first correction patterns RP1 and a plurality of second correction patterns RP2 in the correction pattern RP. (A) to (C) of FIG. 7 illustrate an example of a difference in the overlapping method between the first correction patterns RP1 and the second correction patterns RP2 due to the positional misalignment in the left-right direction.

As illustrated in FIG. 2 and the like, in this example, a pattern including a line (hereinafter, referred to as a main scanning direction line) extending in the left-right direction is used as the first correction pattern RP1 and the second correction pattern RP2 included in the correction pattern RP used when the coarse adjustment is performed. In this case, the line can be considered as a linear pattern or the like formed by arranging a plurality of ink dots in a direction orthogonal to a width direction in a range of a regular width. The main scanning direction line can be considered as a rectangular pattern or the like in which a width in the front-back direction is less than a width in the left-right direction. In this example, each of the first correction patterns RP1 and each of the second correction patterns RP2 used at the time of the coarse adjustment can be considered as a pattern including a plurality of main scanning direction lines.

When the first correction pattern RP1 and the second correction pattern RP2 are used in the coarse adjustment, even though the amount of misalignment between the landing positions at a point in time before the adjustment is performed is large, the main scanning direction lines extend in the left-right direction, and thus, the first correction pattern RP1 and the second correction pattern RP2 can appropriately overlap each other. Accordingly, the coarse adjustment can be appropriately performed.

On the other hand, the fine adjustment is performed in a state in which the amount of misalignment between the landing positions is reduced to a certain degree or less by being performed after the coarse adjustment is performed. In the fine adjustment, a change in concentration caused by the overlapping method of the first correction patterns RP1 and the second correction patterns RP2 can be desirably detected with higher accuracy. In this case, as the first correction pattern RP1 and the second correction pattern RP2 included in the correction pattern RP used when the fine adjustment is performed, for example, a line extending in the front-rear direction (hereinafter, referred to as a sub scanning direction line) as illustrated in (A) and (B) of FIG. 6 is considered instead of the line extending in the left-right direction. The sub scanning direction line can be considered as a rectangular pattern in which a width in the left-right direction is less than a width in the front-back direction. More specifically, in this example, a pattern including a plurality of sub scanning direction lines is used as each of the first correction patterns RP1 and each of the second correction patterns RP2 used in the fine adjustment.

In this case, when attention is paid to the widths in the left-right direction and the front-back direction for the main scanning direction lines in the first correction pattern RP1 and the second correction pattern RP2 for the coarse adjustment and the sub scanning direction lines in the first correction pattern RP1 and the second correction pattern RP2 for the fine adjustment, it can be considered that the widths in the left-right direction of the sub scanning direction lines included in the first correction pattern RP1 and the second correction pattern RP2 in the correction pattern RP used when the fine adjustment is performed are less than the widths in the left-right direction of the main scanning direction lines included in the first correction pattern RP1 and the second correction pattern RP2 in the correction pattern RP used when the coarse adjustment is performed. In this case, the widths in the front-back direction of the sub scanning direction lines included in the first correction pattern RP1 and the second correction pattern RP2 in the correction pattern RP used for the fine adjustment is considered as being wider than the widths in the front-back direction of the main scanning direction lines included in the first correction pattern RP1 and the second correction pattern RP2 in the correction pattern RP used for the coarse adjustment.

When the first correction pattern RP1 and the second correction pattern RP2 are used in the fine adjustment, for example, as can be understood from the matters illustrated in (A) to (C) of FIG. 7, the widths in the left-right direction of the sub scanning direction lines included in the first correction pattern RP1 and the second correction pattern RP2 are small, and thus, the change in concentration can be easily detected even though the amount of misalignment between the landing positions is small. Accordingly, it is possible to perform the fine adjustment with high accuracy.

In this example, the fine adjustment is also performed by, for example, the operation illustrated in FIG. 5 and the like in the same manner as or similar to the case where the coarse adjustment is performed. With this configuration, the landing position correction can be appropriately performed even when the output of the detection mechanism 106 indicating that the concentration is the lowest at a position different from the position where the concentration is actually the lowest is obtained. In this case, the landing position correction can be performed stepwise and appropriately by performing the coarse adjustment and the fine adjustment. Thus, the landing position correction can be more appropriately performed with high accuracy.

Subsequently, supplementary description regarding each configuration described above, description of modification examples, and the like will be performed. As described above, in this example, the landing position correction is performed by detecting the position where the concentration is the highest in the correction pattern RP. Such a correction operation can also be considered as an operation of the landing position correction without specifying the position where the concentration is the lowest in the correction pattern RP. In this case, performing the landing position correction without specifying the position where the concentration is the lowest in the correction pattern RP can be considered as eliminating the need to specify the position where the concentration is the lowest in the correction operation, and the like.

In this example, the landing position correction is considered as, for example, changing a timing of ejecting the ink from the nozzle of the inkjet head 102. More specifically, in this case, the landing position correction can be appropriately performed by changing the timing of ejecting the ink in accordance with the amount of misalignment $\Delta L$ between the landing positions calculated by the operation described above.

In the above description, the correction operation when the center position CL in the left-right direction of the correction pattern RP is used as the reference position has been mainly described. However, a position other than the center position CL is considered as the reference position. In this case, the landing position correction can also be appropriately performed by performing the adjustment such that the concentration of the correction pattern RP is the lowest at the reference position.

As described above, in this example, the ultraviolet-curable ink is used as the ink ejected from the inkjet head 102. In this case, the arrangement of the ink dots formed on the print medium 50 easily becomes uneven (mat shape) as compared to, for example, the case where the evaporation drying type ink is used. As a result, light is easily reflected in various directions on the print medium 50. Thus, in the case where the ultraviolet-curable ink is used, when an attempt is made to detect the position where the concentration is the lowest for the concentrations of the correction pattern RP, it is considered that it is particularly difficult to detect a correct position. As a result, it is considered that it is difficult to appropriately perform the landing position correction. On the other hand, in this example, the landing position correction can be appropriately performed with higher accuracy even when the ultraviolet-curable ink is used by detecting the position where the concentration is the highest in the correction pattern RP.

In the modification example of the configuration of the printing device 10, it is also considered that ink other than the ultraviolet-curable ink as described above is used as the ink ejected from the inkjet head 102. In such a case, it may be difficult to correctly detect the position where the concentration is the lowest. More specifically, when the ink is ejected from the inkjet head 102, a part of the ink ejected in one ejection operation becomes a satellite, and may land at a position different from a main droplet. In this case, the satellite is a minute droplet separated from the main droplet. In this case, the satellite lands around a landing position of the main droplet, and thus, the concentration of the divided detection range DA detected by the detection mechanism 106 may become high as compared with the case where the satellite is not generated. As a result, the concentration at each of the positions of the correction pattern RP changes due to the influence of the satellite, and the output of the detection mechanism 106 indicating that the concentration is the lowest may be obtained at a position different from the position where the concentration is actually the lowest. Even in such a case, it is possible to more appropriately detect the position where the concentration is the highest in the correction pattern RP with higher accuracy. Thus, the method for correcting the landing position described above can be suitably used even when ink other than the ultraviolet-curable ink is used.

In the above description, the printing device 10 that performs the printing on the print medium 50 has been mainly described. In this case, the printing device 10 can be considered as a device that prints an image on the print medium 50. In a modification example of the configuration of the printing device 10, the printing device 10 may operate as a so-called 3D printer. In this case, the printing device 10 can be considered as a device or the like that shapes a stereoscopic three-dimensional object. In this case, the landing position correction can be performed, for example, by printing the correction pattern RP on the print medium 50 by using the print medium 50 for correction.

INDUSTRIAL APPLICABILITY

The invention can be suitably used in, for example, a printing device.

The invention claimed is:

1. A printing device that performs printing by an inkjet method, the printing device comprising:
- an inkjet head that ejects ink;
- a carriage on which the inkjet head is mounted;
- a carriage drive mechanism that moves the inkjet head together with the carriage by moving the carriage in a predetermined main scanning direction;
- a detection mechanism that detects concentrations of a correction pattern which is a pattern used for correcting misalignment between landing positions of the ink ejected from the inkjet head; and
- a controller that causes the inkjet head to print the correction pattern by controlling operations of the carriage drive mechanism and the inkjet head, and corrects the misalignment between the landing positions based on the concentrations of the correction pattern detected by the detection mechanism,
- wherein, when one side in the main scanning direction is defined as a first direction side and the other side in the main scanning direction is defined as a second direction side, the correction pattern is a pattern for correcting misalignment between a landing position of the ink ejected from the inkjet head when the carriage moves to the first direction side and a landing position of the ink ejected from the inkjet head when the carriage moves to the second direction side, and includes a plurality of first direction patterns which are a plurality of patterns printed by the inkjet head when the carriage moves to the first direction side and a plurality of second direction patterns which are a plurality of patterns printed by the inkjet head when the carriage moves to the second direction side,
- the plurality of first direction patterns and the plurality of second direction patterns are arrayed such that a difference in positions where the first direction pattern and the second direction pattern overlap with each other depending on positions in the main scanning direction by arraying the plurality of first direction patterns at a regular interval in the main scanning direction and arraying the plurality of second direction patterns at a regular interval in the main scanning direction wider than the interval between the first direction patterns,
- the concentrations of the correction pattern detected by the detection mechanism change depending on the positions in the main scanning direction by changing the difference in positions where the first direction pattern and the second direction pattern overlap with each other depending on the positions in the main scanning direction, and the controller detects a position where the concentration is the highest among the concentrations of the correction pattern changing depending on the positions in the main scanning direction, calculates magnitude of the misalignment between the landing position of the ink ejected from the inkjet head when the carriage moves to the first direction side and the landing position of the ink ejected from the inkjet head when the carriage moves to the second direction side based on a detection result of the position where the concentration is the highest, and corrects the misalignment between the landing positions based on a calculation result of the magnitude of the misalignment, wherein the concentrations of the correction pattern change such that the concentration is the lowest at a position where the first direction pattern and the second direction pattern overlap with each other with positions in the main scanning direction aligned and the concentration is the highest at a position where the first direction pattern and the second direction pattern overlap with each other with the positions in the main scanning direction misaligned.

2. The printing device as set forth in claim 1, wherein a distance between a position where the concentration is the highest and a position where the concentration is the lowest in the concentrations of the correction pattern is a known predetermined distance, and the controller estimates a position where the concentration is low in the correction pattern based on a detection result of the position where the concentration is the highest and the known predetermined distance, and calculates a distance between a preset reference position in the correction pattern and the position where the concentration is the lowest in the correction pattern based on an estimation result of the position where the concentration is the lowest, and corrects the misalignment between the landing positions such that the concentration of the correction pattern is the lowest in the reference position based on a calculation result of the distance.

3. The printing device as set forth in claim 2, wherein the reference position is a center position of the correction pattern in the main scanning direction.

4. The printing device as set forth in claim 1, wherein the inkjet head ejects ultraviolet-curable ink.

5. The printing device as set forth in claim 1, wherein each of the plurality of first direction patterns is a pattern including a predetermined number of dots in the main scanning direction, and each of the plurality of second direction patterns is a pattern including a predetermined number of dots in the main scanning direction.

6. The printing device as set forth in claim 1, wherein the controller divides a detection range of the correction pattern by the detection mechanism into a plurality of divided detection ranges of a number equal to or greater than the number of first direction patterns included in the detection range of the correction pattern in the main scanning direction, and detects, as the position where the concentration is the highest, a position of the divided detection range in which a concentration is the highest among the plurality of divided detection ranges.

7. The printing device as set forth in claim 1, wherein the controller performs, as the correction of the misalignment between the landing positions, first accuracy correction for correcting the misalignment between the landing positions with first accuracy and second accuracy correction for correcting the misalignment between the landing positions with second accuracy higher than the first accuracy after the first accuracy correction is performed, and uses, as the correction pattern used when the second accuracy correction is performed, a pattern different from the correction pattern used when the first accuracy correction is performed.

8. The printing device as set forth in claim 7, wherein the first direction pattern and the second direction pattern included in the correction pattern used when the first accuracy correction is performed are patterns including main scanning direction lines which are lines extending in the main scanning direction, and the first direction pattern and the second direction pattern included in the correction pattern used when the second accuracy correction is performed are patterns including sub scanning direction lines which are lines extending to a sub scanning direction orthogonal to the main scanning direction.

9. The printing device as set forth in claim 8, wherein widths in the main scanning direction of the sub scanning direction lines included in the first direction pattern and the second direction pattern included in the correction pattern used when the second accuracy correction is performed are less than widths in the main scanning direction of the main scanning direction lines included in the first direction pattern and the second direction pattern included in the correction pattern used when the first accuracy correction is performed, and widths in the sub scanning direction of the sub scanning direction lines included in the first direction pattern and the second direction pattern included in the correction pattern used when the second accuracy correction is performed are greater than widths in the sub scanning direction of the main scanning direction lines included in the first direction pattern and the second direction pattern included in the correction pattern used when the first accuracy correction is performed.

10. A correction method for correcting misalignment between landing positions of ink ejected in a printing device that performs printing by an inkjet method, wherein the printing device includes an inkjet head that ejects ink, a carriage on which the inkjet head is mounted, a carriage drive mechanism that moves the inkjet head together with the carriage by moving the carriage in a predetermined main scanning direction, and a detection mechanism that detects a concentration of a correction pattern which is a pattern used for correction the misalignment between the landing positions of the ink ejected from the inkjet head, and the correction method comprises causing the inkjet head to print the correction pattern by controlling operations of the carriage drive mechanism and the inkjet head and correcting the misalignment between the landing positions based on the concentrations of the correction pattern detected by the detection mechanism, providing, when one side in the main scanning direction is defined as a first direction side and the other side in the main scanning direction is defined as a second direction side, the correction pattern that is a pattern for correcting misalignment between a landing position of the ink ejected from the inkjet head when the carriage moves to the first direction side and a landing position of the ink ejected from the inkjet head when the carriage moves to the second direction side and includes a plurality of first direction patterns which are a plurality of patterns printed by the inkjet head when the carriage moves to the first direction side and a plurality of second direction patterns which are a plurality of patterns printed by the inkjet head when the carriage moves to the second direction side, arraying the plurality of first direction patterns and the plurality of second direction patterns such that an overlapping method of the first direction pattern and the second direction pattern is different depending on positions in the main scanning direction by arraying the plurality of first direction patterns at a regular interval in the main scanning direction and arraying the plurality of second direction patterns at a regular interval in the main scanning direction wider than the interval between the first direction patterns, changing the concentrations of the correction pattern detected by the detection mechanism depending on the positions in the main scanning direction by changing the overlapping method of the first direction pattern and the second direction pattern depending on the positions in the main scanning direction, and detecting a position where the concentration is the highest among the concentrations of the correction pattern changing depending on the positions in the main scanning direction, calculating magnitude of the misalignment between the landing position of the ink ejected from the inkjet head when the carriage moves to the first direction side and the landing position of the ink ejected from the inkjet head when the carriage moves to the second direction side based on a detection result of the position where the concentration is the highest, and correcting the misalignment between the landing positions based on a calculation result of the magnitude of the misalignment, wherein changing the concentrations of the correction pattern such that the concentration is the lowest at a position where the first direction pattern and the second direction pattern overlap with each other with positions in the main scanning direction aligned and the concentration is the highest at a position where the first direction pattern and the second direction pattern overlap with each other with the positions in the main scanning direction misaligned.

* * * * *